United States Patent [19]
Matty et al.

[11] Patent Number: 5,193,111
[45] Date of Patent: Mar. 9, 1993

[54] AUTOMATED DATA TRANSMISSION SYSTEM

[75] Inventors: Thomas C. Matty, N. Huntingdon, Pa.; Robert G. Colclaser, III, Grafton, Mass.; Gary O. Hitchins, Sewickley Township, Westmoreland County, Pa.

[73] Assignee: ABB Power T&D Company, Blue Bell, Pa.

[21] Appl. No.: 815,886

[22] Filed: Jan. 6, 1992

Related U.S. Application Data

[63] Continuation of Ser. No. 445,295, Dec. 4, 1989, abandoned.

[51] Int. Cl.$^5$ .............................................. H04M 11/00
[52] U.S. Cl. ..................................... 379/106; 379/107; 379/102
[58] Field of Search ................ 379/106, 107, 102, 105

[56] References Cited

U.S. PATENT DOCUMENTS

| | | | |
|---|---|---|---|
| 3,868,640 | 2/1975 | Binnie et al. | 379/107 |
| 3,927,800 | 12/1975 | Zinsmeyer et al. | 379/107 |
| 4,104,486 | 8/1978 | Martin et al. | 379/107 |
| 4,352,164 | 9/1982 | Reed et al. | 379/107 |
| 4,455,453 | 6/1984 | Parasekvakos et al. | 379/107 |
| 4,540,849 | 9/1985 | Oliver | 379/107 |
| 4,578,534 | 3/1986 | Shelley | 379/90 |
| 4,654,868 | 3/1987 | Shelley | 379/107 |
| 4,847,892 | 7/1989 | Shelley | 379/107 |

FOREIGN PATENT DOCUMENTS 2099260 12/1982 United Kingdom ................ 379/107

Primary Examiner—James L. Dwyer
Assistant Examiner—Ahmad F. Matar
Attorney, Agent, or Firm—A. J. Rossi

[57] ABSTRACT

A method and apparatus for controlling the transmission of data, via a telephone network (20), between a first location (2,14,16) where data is collected and a central station (22). Data transmission is effected by: collecting and storing data (24–36) at the first location (2); providing an indication (42) of the current time at the first location; storing, at the first location, an indication (30) of a selected time which is after the present time and an indication (32–36) of selected ones of the plurality of data types; comparing (42) the indication of the present and selected times and establishing a connection (56), via the telephone network (20), from the first location (2,14,16) to the central station (22) when the present time becomes later than the selected time; and effecting a communication, via the connection, which includes a first transmission (56) of the selected ones of the stored data type from the first location (2,14,16) to the central station (22) and a second transmission (58), from the central station (22) to the first location (2,14,16), of an indication of a new selected time, and identification of the data to be collected and the locations from which that data will be obtained, for the next communication.

17 Claims, 3 Drawing Sheets

AUTOMATED DATA TRANSMISSION SYSTEM

This is a continuation of application Ser. No. 445,295, filed on Dec. 4, 1989, now abandoned.

BACKGROUND OF THE INVENTION

The present invention relates to an automated data transmission system for the periodic transmission of acquired data from a communication system installed at a remote location to a central station via a telephone line.

The development of data transmission systems employing modems to transmit and receive coded data via telephone lines has lead to the development of various types of applications of this technology. Among these is a communication system for transmitting energy consumption data from electric utility meters to centralized data collection stations, thereby obviating the need to periodically send a meter reader to the metered location. Such a system requires a meter equipped with an electronic register containing a CPU and a suitable memory. Such registers are presently marketed by the Westinghouse Electric Corporation under the tradename EMF 2000.

U.S. Pat. Nos. 4,241,237 and 4,455,453 disclose systems for transmitting electric utility meter readings from a remote location to a central station via a telephone line. To establish a connection, a call is initiated to a preprogrammed telephone number from the remote location at a scheduled time and meter data is then transmitted. These patents propose the provision of two sensors for monitoring two different functions. At the completion of a transmission, the central station transmits instructions informing the remote location of the next scheduled time for establishing a connection.

Since such a system will normally share a telephone line with conventional telephone instruments, each transmission constructed by the system should have a short duration. This requirement imposes a significant restriction on the amount of data which can be collected and transmitted, with the result that the practical value of such a system is limited.

SUMMARY OF THE INVENTION

It is an object of the present invention to transmit a variety of data from a remote location to a selected central station during a transmission session of limited duration.

A further object of the invention is to transmit data from a number of instruments or devices at the remote location.

Another object of the invention is to select the data to be transmitted on the basis of instructions provided from the central station.

The invention is embodied in a method and apparatus for controlling the transmission of data, via a telephone network, from at least one data storage device at a first location where data is collected to a central station by:
  collecting and storing a plurality of types of data at the first location;
  providing an indication of the current time at the first location;
  storing, in a first storing step, an indication at the first location of a selected time which is after the present time;
  storing, in a second storing step, an indication of selected ones of the plurality of types of data;
  comparing the indication of the present and selected times and establishing a connection, via the telephone network, from the first location to the central station when the present time becomes later than the selected time; and
  effecting a communication, via the connection, which includes a first transmission of the selected ones of the stored data types from the first location to the central station and a second transmission of an indication of the types of data to be transmitted during the next communication and an indication of a new selected time from the central station to the first location.

DESCRIPTION OF THE PREFERRED EMBODIMENTS

The invention will be described with reference to a system intended to communicate with a power utility. However, it is to be understood that the invention can be employed to establish communication between a wide variety of data collection devices and a selected central station.

Figure 1:
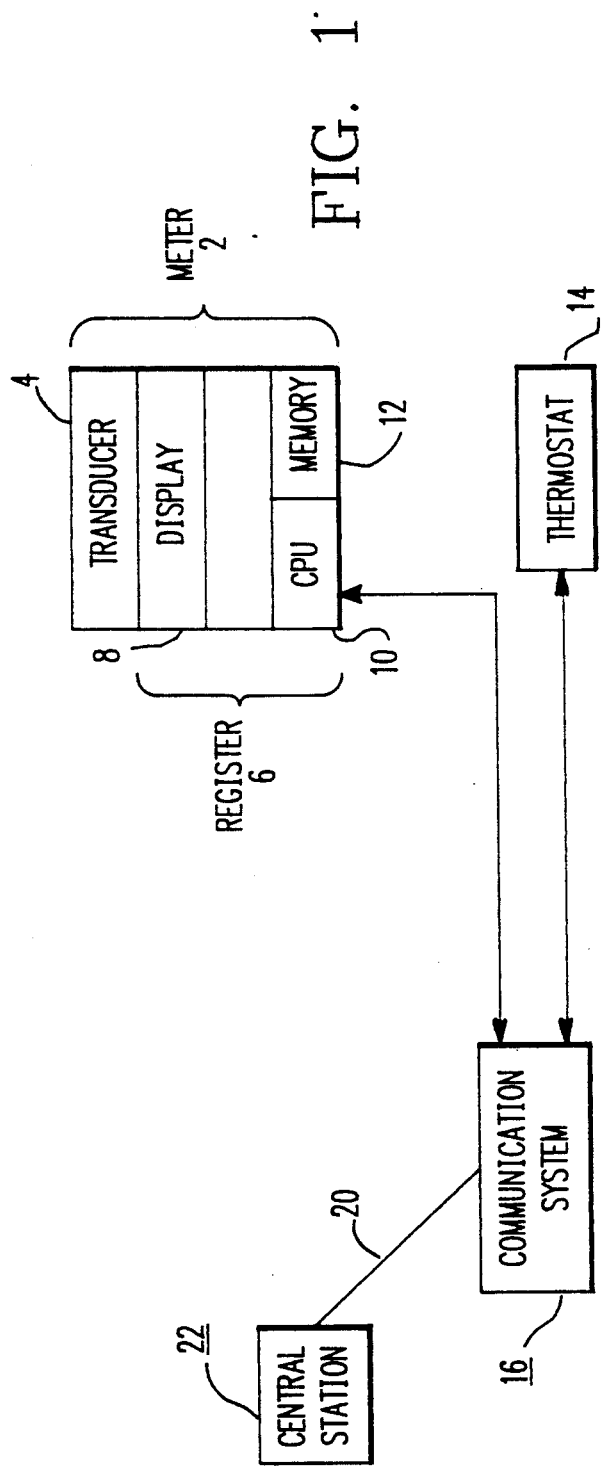
FIG. 1 is a block diagram of a system which can be configured to, operate according to the present invention.

The system illustrated in FIG. 1 includes a power utility meter 2 which, as is already known in the art, includes a transducer 4 which provides a signal indicative of energy consumption at the metered location. Transducer 4 is coupled to an electronic register 6 which includes, inter alia, a digital display 8, a CPU 10 and a memory 12, which is preferably a nonvolatile RAM. Memory 12 is connected to be controlled by CPU 10.

In the operation of meter 2, energy consumption signals produced by transducer 4 are converted into energy consumption readings by suitable electronic circuitry, and the resulting information is supplied to display 8, as well as to memory 12. The information supplied to memory 12 may indicate not only accumulated energy usage, but may also include information relating to peak demand and time of energy use.

A system of the type contemplated by the invention may also be provided with one or more thermostats 14 of the type which can be provided with a plurality of time-related temperature settings, are equipped with an electronic unit which permits various types of information to be displayed, and store temperature setting information in digital form. Thermostat 14 could be constructed to display various types of information including, for example, billing information related to date and time to aid the user in selecting thermostat temperature settings.

The system may further include any other types of devices provided at the remote location to collect and store data, which devices could be coupled in the system in the same manner as thermostat 14.

Thermostat 14 and CPU 10 are connected to a communication system 16 which also contains a CPU and memory units, as well as a modem and circuitry for connecting the modem to a telephone line 20 via which communications may be conducted with a central station 22.

One suitable embodiment of a communication system connectable to a telephone line for transmitting data to and from such registers is marketed by the Westinghouse Electric Corporation under the tradename COMSET 2000.

Communications with central station 22 are to be established for the purpose of periodically transmitting energy consumption data to central station 22. In addition, it may be desired to transmit from each thermostat 14 information relating, for example, to the thermostat temperature settings. It may also be desired to transmit various types of information from central station 22 to register 6 and each thermostat 14.

In the system described herein, a data transmission session may be initiated on the basis of instructions stored in register 6, rather than on the basis of a call from central station 22. For this purpose, a date and time for initiating such a transmission is stored in memory 12, which is also operated to store meter reading data. In addition, CPU 10 is configured to store additional information in memory 12 and to transmit such information in a selected sequence to communication system 16 at the time when a data transmission is to be initiated. For this purpose, the electronic system in register 6 further includes a real time clock.

When a data transmission session is to be initiated, a data and address sequence is assembled in register 6, under control of CPU 10 and, when the designated time for establishing a connection with central station 22 is reached, this data and address sequence is transmitted to communication system 16.

Such a sequence typically includes information identifying the location of devices 2, 14 and 16, the telephone number of central station 22, the number of thermostats, the present time, and identification of each device from which data is to be obtained and the type of data to be obtained from each identified device.

Each device may contain several different items of information, each of which is termed a "data type". When a large number of data types are stored, only certain of those data types will be selected for transmission during a given communication session.

Each data type is associated with a particular addressable memory location either in a data portion of memory 12 or in a memory of each thermostat 14, etc. Memory 12 further has a control portion containing memory locations which will store the above-described sequence. The data types to be transmitted during a transmission session have been identified in the information contained in a transmission from central station 22 during the previous transmission session.

By way of example, in the particular system shown in FIG. 1, the data types associated with meter 2 may require that memory 12 have a memory capacity of 9000 bytes and the data types associated with each thermostat 14 may require a thermostat memory capacity of 825 bytes. If all of this data were transmitted at each transmission session, or "call-in", the amount of data to be sent would be in excess of 12,000 bytes. By identifying specific data types for each transmission session, the amount of data, and hence the duration of the session, can be reduced to acceptable levels.

Figure 2:
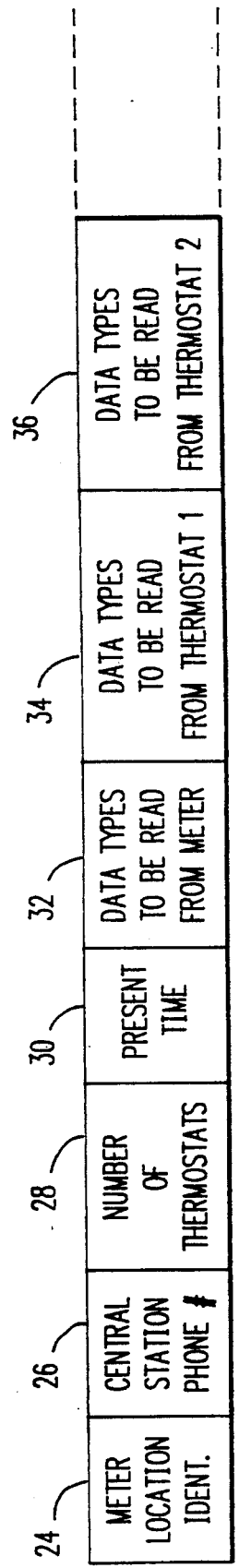
FIG. 2 is a representation of a data sequence established for performing a communication transmission in accordance with the present invention.

One suitable arrangement of this sequence is illustrated in FIG. 2 and includes the following data blocks:

Block 24 contains information identifying the building where the meter is located.

Block 26 contains the telephone number of the central station.

Block 28 contains information identifying the number of thermostats associated with the system being metered.

Block 30 contains information indicating the present time.

Blocks 32, 34 and 36 represent one specific and nonlimiting example of an arrangement of identifying data in such a sequence. Block 32 identifies meter 2 and the addresses of the data types to be read from meter 2, block 34 identifies thermostat 1 and the addresses of the data types to be read from thermostat 1, and block 36 identifies thermostat 2 and the addresses of the data types to be read from thermostat 2. Since each of these blocks contains an identification of the device to which it pertains, these blocks can have any time position in the transmission from central station 22.

Each block can contain any requisite number of words. In the case of blocks 32, 34 and 36, each word identifies the intended device and the address of a respective data type.

When the real time indicated by the clock in register 6 passes the time value stored in memory 12, the data sequence illustrated in FIG. 2 is assembled in register 6 and is sent to communication system 16. On the basis of the information stored in data blocks 32 to 36, system 16 addresses memory 12 and the memories in the thermostats and obtains the values stored in the addressed memory locations. Then, on the basis of the information contained in data block 26, communication system 16 initiates a call to central station 22 and after a connection has been established, transmits the assembled data, including the values contained in the addressed memory locations of the devices.

Before transmitting the data sequence shown in FIG. 2 to communication system 16, register 6 is placed in a "call-in state" which can be cleared only after the call has been completed. After the call-in state has been entered, register 6 transfers the data sequence to system 16 and continues to store that data sequence for subsequent transfer to system 16 if a call has not been completed in a specified time period, which may be of the order of 1 hour. This allows for delays in establishing a connection with central station 22, including delays which may be occasioned by the fact that the telephone line at the location being metered is being used by an occupant of that location, in which case the communication with central station 22 would have to be delayed.

The time allowed for conducting a communication is determined by two timers: a session timer in register 6; and an update timer in communication system 16. The update timer determines the time allowed from the start of a communication to the transfer of all incoming data to register 6 and will be cleared when the latter event occurs. The session timer determines the time allowed from initiation of the call-in state to verification, in register 6, of a new call-in time, and will be cleared when the latter event occurs. According to one embodiment of the invention, the update timer may be set to a cut-off time of 45 minutes and the session timer set to a cut-off time of 1 hour.

After the data sequence assembled in system 16 has been successfully transmitted, a return message is sent from central station 22 and this return message includes, at least, the designation of the next time at which a transmission from system 16 to central station 22 is to be initiated in order to transmit new data. If the return message includes other information, the designation of the next transmission time should preferably be the last item in the message.

If the expected response from central station 22 is received by register 6 within the selected period designated by the session timer, the communication session is terminated until the new time designated by the information supplied from central station 22 is reached.

Figure 3A:
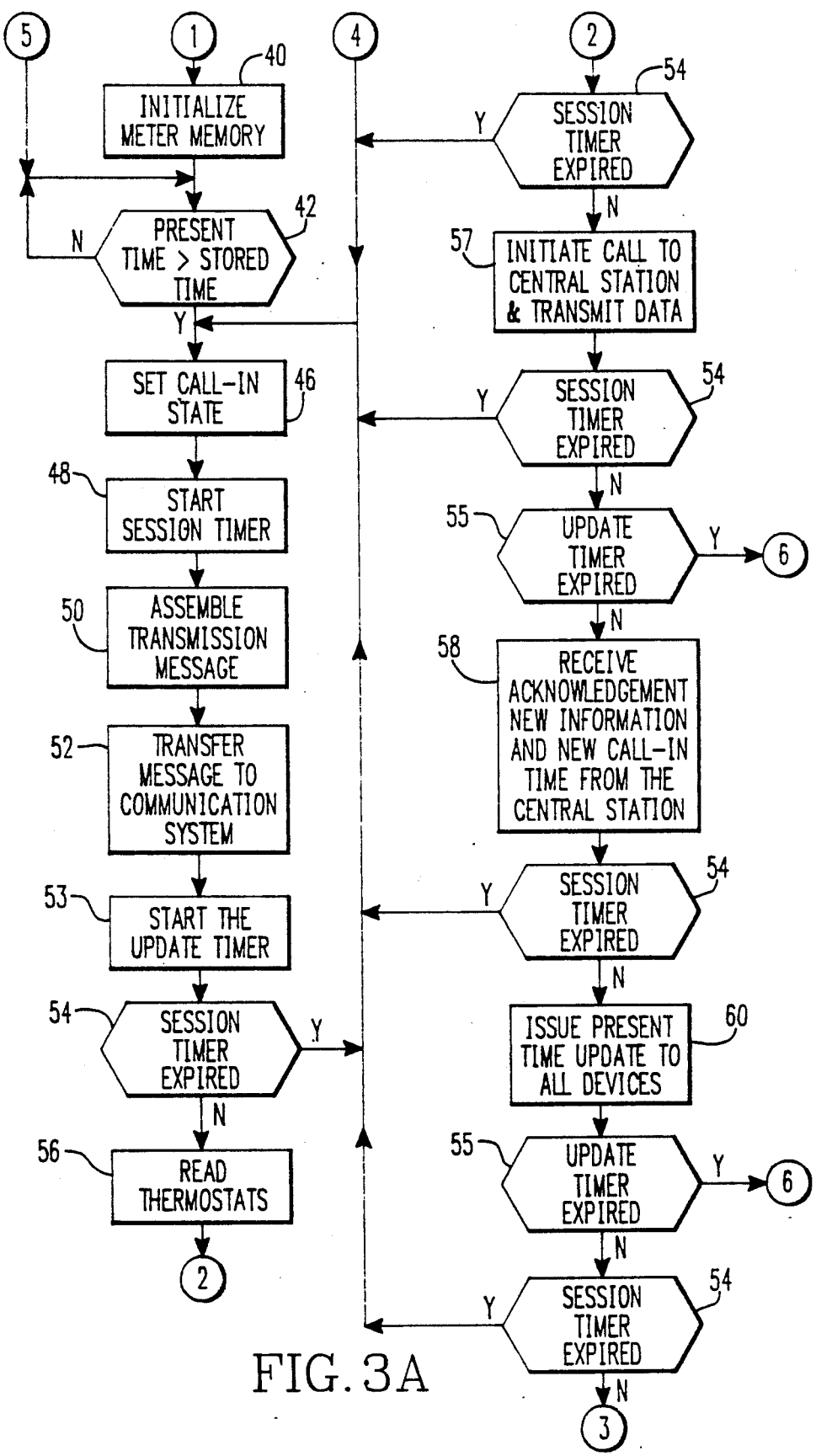
FIGS. 3A and 3B together present a programming flow diagram illustrating the practice of the present invention.
Figure 3B:
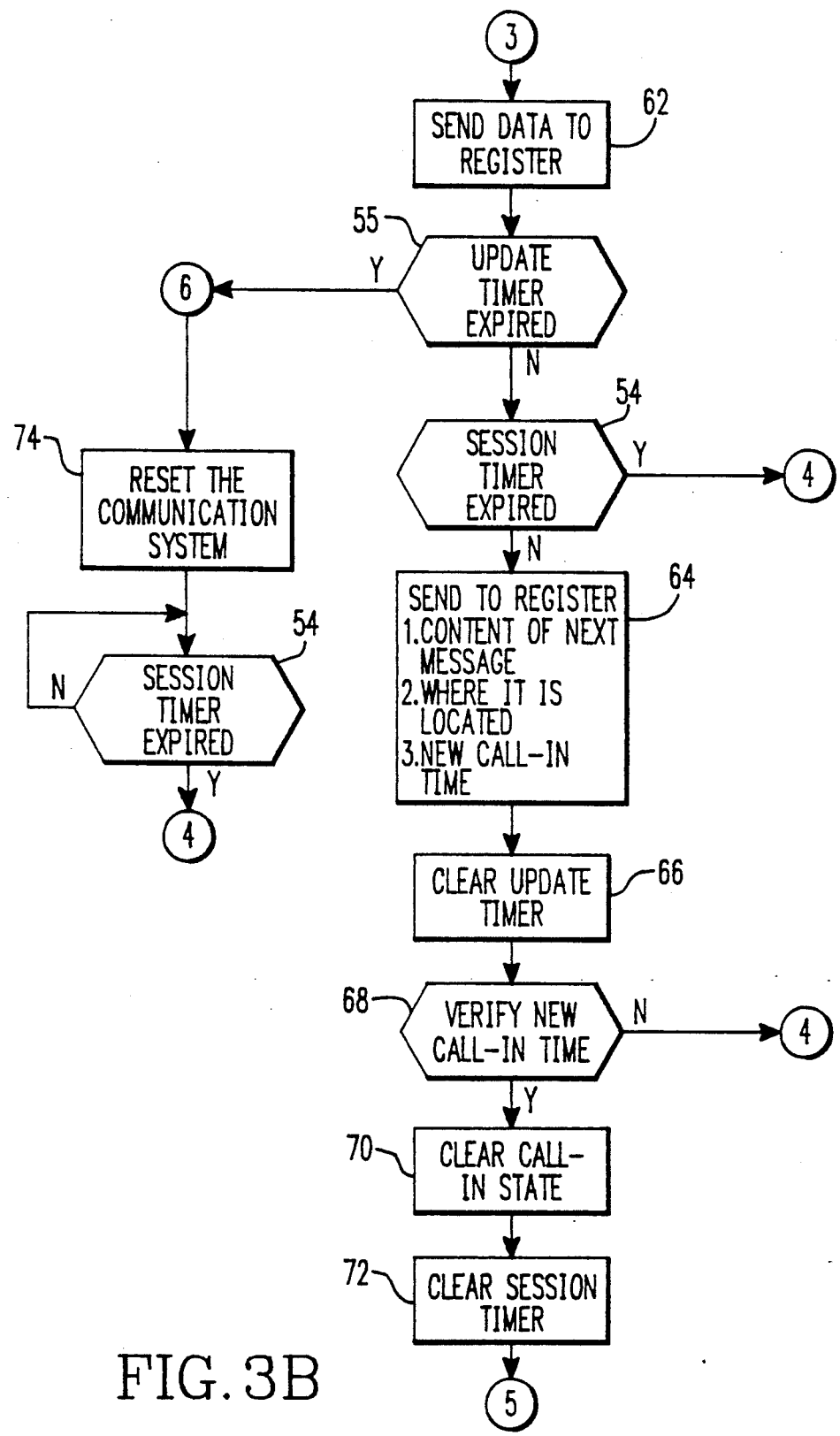

One example of an operating sequence according to the present invention is illustrated in FIGS. 3A and 3B. Numbered circles on these Figures indicate the flow of data between them. In function block 40, meter memory 12 is initialized. This is an operation which would be performed once at the time of meter installation.

In decision block 42, the present time, which is indicated by the clock in register 6, is read, and this is compared with the time of the next call-in which is stored in memory 12. If the present time has not yet exceeded the stored call-in time, the clock in register 6 is interrogated periodically until the stored call-in time is exceeded. A "yes" decision is based on the present time exceeding the stored time so that if the meter is not receiving power when the stored call-in time is reached, initiation of a calling operation will occur when power is again supplied to the meter.

When the condition examined in decision block 42 is reached, register 6 is set to a "call-in state" in function block 46. When this occurs, a communication session timer in register 6 is started, as indicated by function block 48. Then, in function block 50 the data sequence illustrated in FIG. 2 is assembled and in function block 52, the assembled message is transferred to communication system 16. All of the operations described thus far take place in the computer components in register 6.

Upon receipt of the data sequence, communication system 16 starts the update timer, function block 53, and thereafter the session timer is interrogated in decision blocks 54 and the update timer is interrogated in decision blocks 55 at selected points in the communication procedure.

Then, in function block 56, system 16 reads all devices identified in the data sequence, in the illustrated embodiment including register 6 and the thermostats and, in function block 57, initiates a call to central station 22 and transmits data once a connection has been established.

Upon completion of the transmission to station 22, that station, in function block 58, transmits an acknowledgement to system 16, together with information to be stored in register 6 and/or thermostat 14 and, finally, information identifying the addresses and devices of the data types to be read and the devices from which they are to be read during the next call-in, and the next call-in time, i.e., the next time at which a communication is to be initiated.

Upon receipt of this information, in function block 60, communication system 16 issues a present time and date update to all connected devices including register 6 and thermostat 14. Then, in function block 62 communication system 16 sends data to register 6 and then, in function block 64 system 16 sends information relating to the next call-in time to register 6. Then, in function block 66, the update timer in communications system 16 is cleared, or reset, and in decision block 68 the computer circuitry in register 6 verifies that a new call-in time has been stored. If verification is made, then, in function block 70, the call-in state of register 6 is cleared, or reset, and in function block 72, the session timer is cleared, or reset, and the process for reading the present time in decision block 42 is resumed.

As is further indicated by the diagram of FIG. 3, if at any time before register 6 is updated (function block 64) the update timer runs out (decision blocks 55), the communication system is reset, as shown at function block 74. Resetting of the communication system terminates the present connection to the central station and prepares the communication system to establish a new connection upon receipt of a new message from the meter register. Then, in a further decision block 54, the session timer is cyclically interrogated until it expires. Thus, if either the update timer or the session timer runs out (decision blocks 54 and 55) before register 6 is updated (function block 64), processing returns to the point at which the session timer is restarted (function block 46). In addition, if receipt of a new call-in time is not verified (function block 68), processing also returns to function block 46.

The establishment of a connection can alternatively be initiated by a signal from central station 22 for the purpose of deriving meter reading data. This manner of establishing a connection is already known in the art.

Furthermore, signal transmission between system 16 and CPU 10 and each thermostat 14 can be effected via the power lines at the remote location using power line carrier communications devices. Such devices are known in the art.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A method for controlling the transmission of data, via a telephone line, from a plurality of data reading and storage devices at a first location where data is collected to a central station, the plurality of data reading and storage devices including a first data reading and storage device having means for reading and storing data of at least one data type and a second data reading and storage device having means for reading and storing data of a plurality of different data types, the method comprising:

collecting and storing data of the at least one type in the reading and storing means of the first device and data of each of the plurality of different types in the reading and storing means of the second device at the first location;

providing an indication of the present time at the first location;

storing, in a first storing step at the first location an indication of a selected time which is later than the present time;

storing, in a second storing step at the first location, an indication of the at least one data type for which data is stored in the first device and an indication of at least a selected one of the plurality of data types for which data is stored in the second device;

comparing the indication of the present and selected times and establishing a connection, via the telephone line, from the first location to the central station when the present time becomes later than the selected time; and effecting a communication, via the connection, which includes a first transmission of data of the selected ones of the stored data types from the first location to the central station and a second transmission, from the central station to the first location, of an indication of a new selected time and an indication of the data types for which data is to be transmitted during the next communication, which data types include the at least one data type for which data is stored in the first device and at least one, but less than all, of the plurality of different data types for which data is stored in the second device.

2. A method as defined in claim 1 further comprising: determining, at the first location, whether the new selected time is later than the present time, and repeating said step of comparing based on the new selected time 3. A method as defined in claim 2 further comprising: terminating the connection after reception of the second transmission.

4. A method as defined in claim 3 wherein: the at least one device includes a first device having means for acquiring data and first data storing means, and a second device having second data storing means which include at least one addressable memory location for storing data relating to the second device; and said second storing step comprises storing, in said first data storing means, an identification of selected data acquired by said means for acquiring data and an identification of selected data stored in said second data storing means.

5. A method as defined in claim 4 wherein said step of collecting and storing data further comprises storing in said first data storing means data representing the telephone number of the central station and data identifying the first location.

6. A method as defined in claim 5 further comprising: monitoring the time interval between said operation of establishing a connection and reception, at the first location, of the second transmission, and if that time interval is longer than a selected time interval, repeating said steps of establishing a connection and effecting a communication.

7. A method as defined in claim 6 wherein: the first location further has a communication system; said step of establishing a connection comprises sending the data stored in the first data storing means to the communication system, and, in the communication system, using the data representing the telephone number of the central station to establish the connection; and said step of effecting a communication is carried out so that the first transmission contains the selected data acquired by the means for acquiring data and the selected data stored in the at least one memory location of the second data storing means.

8. A method as defined in claim 7 wherein said step of effecting a communication includes sending the data stored in the memory location of the second data storing means directly to the communication system.

9. A method as defined in claim 1 wherein the second data reading and storage device is an electric utility meter.

10. Apparatus for controlling the transmission of data, via a telephone line, from a plurality of data reading and storage devices at a first location where data is collected to a central station, the plurality of data reading and storage devices including a first data reading and storage device having means for reading and storing data of at least one data type and a second data reading and storage device having means for reading and storing data of a plurality of different data types, the apparatus comprising:

first means for collecting and storing data of the at least one type in the reading and storing means of the first device and data of each of the plurality of different types in the reading and storing means of the second device at the first location;

second means at the first location for providing an indication of the present time;

third means at the first location for storing an indication of a selected time which is later than the present time;

fourth means at the first location for storing an indication of the at least one data type for which data is stored in the first device and an indication of at least a selected one of the plurality of data types for which data is stored in the second device;

fifth means for comparing the indication of the present and selected times and establishing a connection, via the telephone line, from the first location to the central station when the present time becomes later than the selected time; and sixth means for effecting a communication, via the connection, which includes a first transmission of data of the selected ones of the stored data types from the first location to the central station and a second transmission, from the central station to the first location, of an indication of a new selected time and an indication of the data types for which data is to be transmitted during the next communication, which data types include the at least one data type for which data is stored in the first device and at least one, but less than all, of the plurality of different data types for which data is stored in the second device.

11. Apparatus as defined in claim 10 further comprising: seventh means at the first location for determining whether a new selected time is later than the present time.

12. Apparatus as defined in claim 10 comprising, at the first location, a first device which contains means for acquiring data and said first, second, third, fourth and fifth means, and a second device having data storing means which include at least one addressable memory location for storing data relating to the second device; and wherein said fourth means stores an identification of selected data acquired by said means for acquiring data and an identification of selected data stored in said second data storing means.

13. Apparatus as defined in claim 12 wherein said first means stores data representing the telephone number of the central station and data identifying the first location.

14. Apparatus as defined in claim 13 further comprising eighth means at the first location for monitoring the time interval between the establishment of a connection and reception at the first location of the second transmission.

15. Apparatus as defined in claim 14 wherein said sixth means comprise a communication system at the first location for receiving the data stored in said first means, for using the data representing the telephone number of the central station to establish the connection, and for effecting a communication so that the first transmission contains the selected data acquired by the means for acquiring data and the selected data stored in the at least one memory location of said data storing means of said second device.

16. Apparatus as defined in claim 15 wherein said communication system is connected directly to said second device for receiving the data stored in the at least one memory location of said data storing means of said second device.

17. Apparatus as defined in claim 10 wherein said second data reading and storage device is a electric utility meter.

* * * * *